(12) United States Patent
Elend

(10) Patent No.: US 12,028,184 B2
(45) Date of Patent: Jul. 2, 2024

(54) CONTROLLER AREA NETWORK MODULE AND METHOD FOR THE MODULE

(71) Applicant: NXP B.V., Eindhoven (NL)

(72) Inventor: Bernd Uwe Gerhard Elend, Hamburg (DE)

(73) Assignee: NXP B.V., Eindhoven (NL)

( * ) Notice: Subject to any disclaimer, the term of this patent is extended or adjusted under 35 U.S.C. 154(b) by 60 days.

(21) Appl. No.: 18/154,983

(22) Filed: Jan. 16, 2023

(65) Prior Publication Data

US 2023/0231737 A1    Jul. 20, 2023

(30) Foreign Application Priority Data

Jan. 18, 2022  (EP) .................................. 22151970

(51) Int. Cl.
*H04L 12/40* (2006.01)

(52) U.S. Cl.
CPC .. *H04L 12/40013* (2013.01); *H04L 12/40026* (2013.01); *H04L 2012/40215* (2013.01)

(58) Field of Classification Search
CPC ......... H04L 12/40013; H04L 12/40026; H04L 2012/40215
See application file for complete search history.

(56) References Cited

U.S. PATENT DOCUMENTS

| | | | | |
|---|---|---|---|---|
| 7,373,577 | B2 * | 5/2008 | Uemura | G06F 11/2215 714/48 |
| 10,530,605 | B2 * | 1/2020 | Ruvio | G05B 19/0423 |
| 2014/0016654 | A1 | 1/2014 | Yakashiro | |
| 2016/0286010 | A1 * | 9/2016 | Lennartsson | G06F 13/4072 |
| 2019/0098047 | A1 * | 3/2019 | Giannopoulos | H04L 63/1483 |
| 2022/0138350 | A1 * | 5/2022 | Aue | G06F 21/85 726/22 |
| 2022/0398213 | A1 * | 12/2022 | Cavallaro | G06F 11/1004 |

FOREIGN PATENT DOCUMENTS

| | | | |
|---|---|---|---|
| DE | 102018206522 A1 | 10/2019 | |
| DE | 102019208058 A1 | 12/2020 | |
| EP | 3809638 A1 * | 4/2021 | G01R 27/16 |

OTHER PUBLICATIONS

U.S. Appl. No. 18/061,858, not yet published; 25 pages (Dec. 5, 2022).

* cited by examiner

*Primary Examiner* — Henry Tsai
*Assistant Examiner* — Christopher A Daley
(74) *Attorney, Agent, or Firm* — Jonathan J. Sapan

(57) ABSTRACT

A CAN module that can be integrated between a CAN controller and a CAN transceiver includes a receive data (RXD), input interface for receiving a first bit sequence through a RXD stream and a RXD output interface for sending a manipulated receive data (MRXD), stream including a second bit sequence. A processing logic of the CAN module is configured to manipulate the first bit sequence to generate a second bit sequence comprising a second stuff bit at a second position in the second bit sequence corresponding to a first position of a first stuff bit in the first bit sequence such that the second stuff bit is complementary to a preceding bit of the second stuff bit in the second bit sequence. The present disclosure also relates to a method for the CAN module.

20 Claims, 11 Drawing Sheets

CONTROLLER AREA NETWORK MODULE AND METHOD FOR THE MODULE

CROSS-REFERENCE TO RELATED APPLICATIONS

This application claims the priority under 35 U.S.C. § 119 of European patent application no. 22151970.5, filed Jan. 18, 2022 the contents of which are incorporated by reference herein.

TECHNICAL FIELD

The present disclosure relates to a Controller Area Network (CAN) module and to a method for the CAN module.

BACKGROUND

CAN bus is a message-based communications bus protocol that is often used within automobiles. The CAN bus protocol is used to enable communications between various electronic control units (ECUs), such as an engine control module (ECM), a power train control module (PCM), airbags, antilock brakes, cruise control, electric power steering, audio systems, windows, doors, mirror adjustment, battery and recharging systems for hybrid/electric cars, and many more.

The data link layer of the CAN protocol is standardized as International Standards Organization (ISO) 11898-1. The standardized CAN data link layer protocol is in the process of being extended to provide higher data rates. The extended protocol, referred to as CAN Flexible Data-Rate or "CAN FD," has become part of the existing ISO 11898-1 standard. A further extension, referred to as CAN XL, with a new level scheme allowing even higher data rates is in the definition phase discussed under CiA610 (CAN in Automation), is discussed in draft specification CiA610-1, and is moving towards standardization in the form of either a further update of the existing ISO11898 standards or a new standard.

SUMMARY

Aspects of the disclosure are defined in the accompanying claims.

In accordance with a second aspect of the present disclosure, a Controller Area Network, CAN, module is provided the CAN module comprising a receive data, RXD, input interface configured to receive a RXD stream from a CAN transceiver, a RXD output interface configured to send a manipulated receive data, MRXD, stream to a CAN controller, and a processing logic configured to identify a first bit sequence in the RXD stream, wherein the processing logic is configured to identify a first position for a first stuff bit in the first bit sequence, wherein the processing logic is configured to manipulate the first bit sequence to generate a second bit sequence comprising a second stuff bit at a second position in the second bit sequence corresponding to the first position of the first stuff bit in the first bit sequence such that the second stuff bit is complementary to a preceding bit of the second stuff bit in the second bit sequence, and wherein the CAN module is configured to send the second bit sequence via the RXD output interface to the CAN controller.

In one or more embodiments, the first bit sequence represents a first identifier of a first CAN frame.

In one or more embodiments, the processing logic is configured to identify a predefined number of identical, successive bits in the first bit sequence and, based on this identification, to predict the first position for the first stuff bit in the first bit sequence before and/or while the first stuff bit is received via the RXD input interface.

In one or more embodiments, the processing logic is configured, based on the first bit sequence, to identify the first position of the first stuff bit in the first bit sequence after the first stuff bit is received via the RXD input interface.

In one or more embodiments, the CAN module comprises a transmit data, TXD, input interface configured to receive a TXD stream from the CAN controller, wherein the processing logic configured to identify a third bit sequence in the TXD stream representing bits of a third CAN frame, wherein the processing logic is configured to identify a third position of a third stuff bit in the third bit sequence, wherein the first bit sequence is a result of the third bit sequence, and wherein the processing logic is configured to identify the first position of the first stuff bit in the first bit sequence based on the third position of the third stuff bit in the third bit sequence.

In one or more embodiments, wherein the processing logic is configured to determine whether the third stuff bit is either a dominant third stuff bit or a recessive, third stuff bit.

In one or more embodiments, the processing logic is configured to manipulate the first stuff bit for generating the second stuff bit to be complementary to its preceding bit only if the third stuff bit is determined to be a recessive third stuff bit.

In one or more embodiments, the processing logic is configured to identify multiple first stuff bits in the first bit sequence, wherein the processing logic is configured to manipulate the first bit sequence to generate the second bit sequence comprising for each first stuff bit an associated second stuff bit at a position corresponding to the position of the respective associated first stuff bit in the first bit sequence.

In one or more embodiments, the processing logic is configured to identify a fourth, dominant, non-stuff bit in the third bit sequence, wherein the processing logic is configured to manipulate the first bit sequence to generate the second bit sequence also comprising a fifth non-stuff bit at a position in the second sequence corresponding to the position of the fourth non-stuff bit in the third bit sequence such that the fifth non-stuff bit matches the fourth non-stuff bit.

In one or more embodiments, the CAN module comprising a transmit data, TXD, input interface configured to receive a TXD stream from the CAN controller, wherein the CAN module comprising a decoder configured to decode an identifier of a CAN frame being received via TXD stream, wherein the CAN module comprising a memory configured to store at least one valid identifier, and wherein the CAN module comprising a compare logic configured to compare the identifier being decoded by the decoder with the at least on valid identifier and output a mismatch signal, if the comparison indicates that the decoded identifier does not match any of the at least one valid identifier.

In one or more embodiments, the CAN module comprising a TXD output interface configured to forward the TXD stream to the CAN transceiver, wherein the CAN module is configured to interrupt the forwarding of the TXD stream in response to the mismatch signal.

In one or more embodiments, the CAN module comprising a signal generator configured to generate an invalidation signal in response to the mismatch signal, wherein the CAN module comprising a signal output interface configured to send the invalidation signal to the CAN transceiver to invalidate the CAN frame of the TXD stream.

In accordance with a second aspect of the present disclosure, a method for the Controller Area Network (CAN) module is provided. The method further includes receiving a receive data (RXD) stream from a CAN transceiver at an RXD input interface of the CAN module. The method further includes identifying a first bit sequence in the RXD stream at a processing logic of the CAN module. The method further includes identifying a first position for a first stuff bit in the first bit sequence at the processing logic. The method further includes manipulating the first bit sequence at the processing logic to generate a second bit sequence comprising a second stuff bit at a second position in the second bit sequence corresponding to the first position of the first stuff bit in the first bit sequence such that the second stuff bit is complementary to a preceding bit of the second bit stuff bit in the second bit sequence. Finally, the method further includes sending the second bit sequence via a RXD output interface of the CAN module to a CAN controller.

In one or more embodiments, the method further includes receiving a TXD stream from the CAN controller at a transmit data (TXD) input interface of the CAN module. In such embodiments, the method further includes identifying a third bit sequence in the TXD stream representing bits of a third CAN frame at the processing logic. In such embodiments, the method further includes identifying a third position of a third stuff bit in the third bit sequence at the processing logic, wherein the first bit sequence is a result of the third bit sequence. Finally, in such embodiments, the method further includes identifying, at the processing logic, the first position of the first stuff bit in the first bit sequence based on the third position of the third stuff bit in the third bit sequence.

In one or more embodiments, the method further includes forwarding the TXD stream to the CAN transceiver via a TXD output interface of the CAN module. In such embodiments, the method further includes decoding an identifier of a CAN frame being received via the TXD input interface at a decoder of the CAN module, wherein the CAN module comprising a memory configured to store at least one valid identifier. In such embodiments, the method further includes comparing, at a compare module of the CAN module, the identifier being decoded with the at least on valid identifier and output a mismatch signal, if the comparison indicates that the decoded identifier does not match any of the at least one valid identifier. Finally, in such embodiments, the method further includes interrupting the forwarding of the TXD stream in response to the mismatch signal.

BRIEF DESCRIPTION OF THE DRAWINGS

Embodiments of the present disclosure will be described in more detail with reference to the appended drawings, in which.

DETAILED DESCRIPTION

Figure 1:
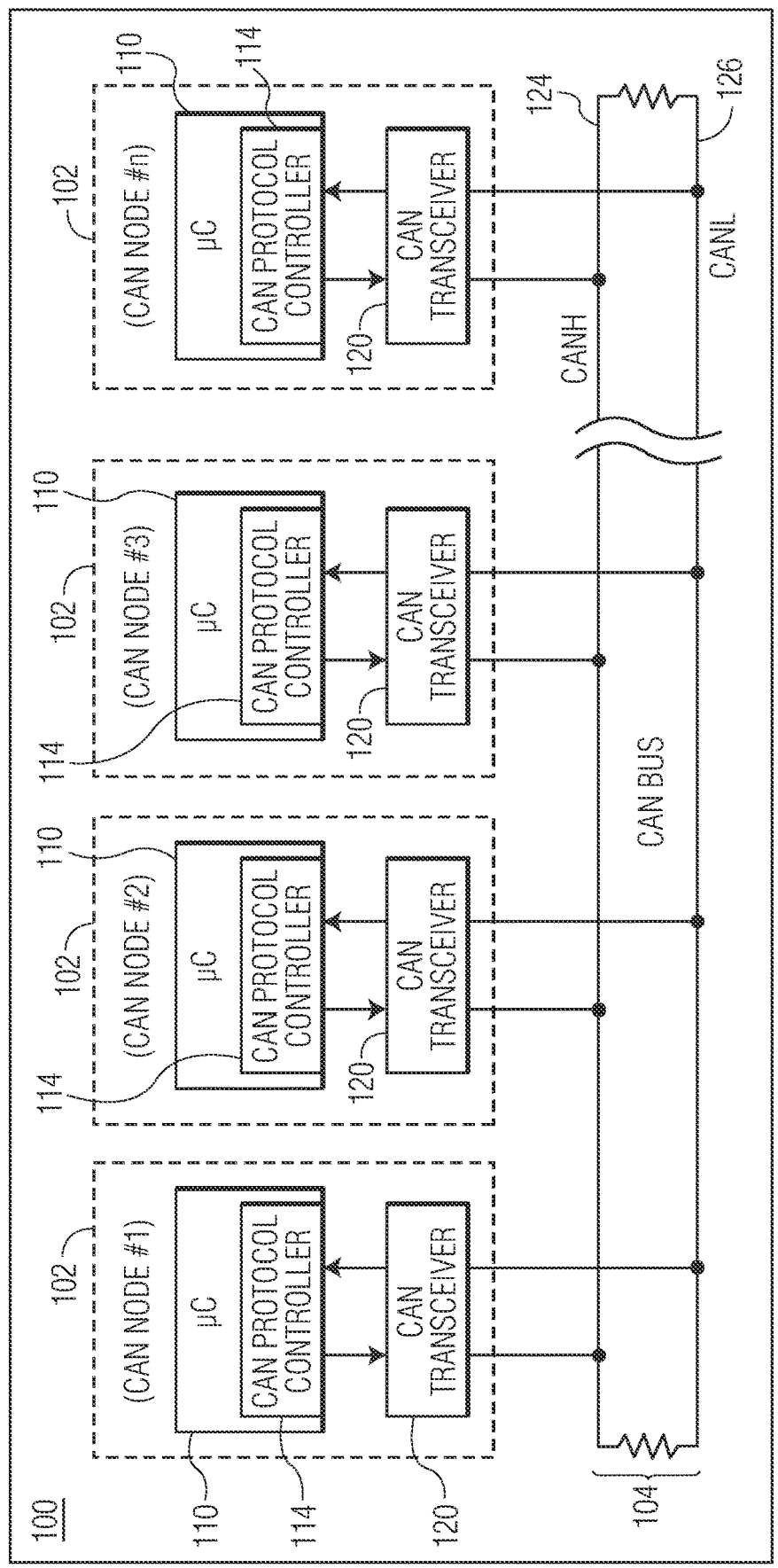
FIG. 1 depicts a CAN network that includes multiple CAN nodes connected to a CAN bus.

FIG. 1 depicts a CAN network 100 that includes multiple CAN nodes 102, also referred to as "ECUs," each connected to a CAN bus 104. In the embodiment of FIG. 1, each CAN node includes a microcontroller 110 having an embedded CAN protocol controller 114 and a CAN transceiver 120. The CAN protocol controller 114 may be referred to as a controller or CAN controller. The CAN transceiver 120 may be referred to as a transceiver.

The microcontrollers 110 are typically connected to at least one device (not shown) such as a sensor, an actuator, or some other control device and are programmed to determine the meaning of received messages and to generate appropriate outgoing messages. The microcontrollers 110, which may also be referred to as host processors, hosts or digital signal processors (DSPs), are known in the field. In an embodiment, the host supports application software that interacts with the CAN protocol controller.

The CAN bus 104 carries analog differential signals and includes a CAN high (CANH) bus line 124 and a CAN low (CANL) bus line 126. The CAN bus is known in the field.

Figure 2:
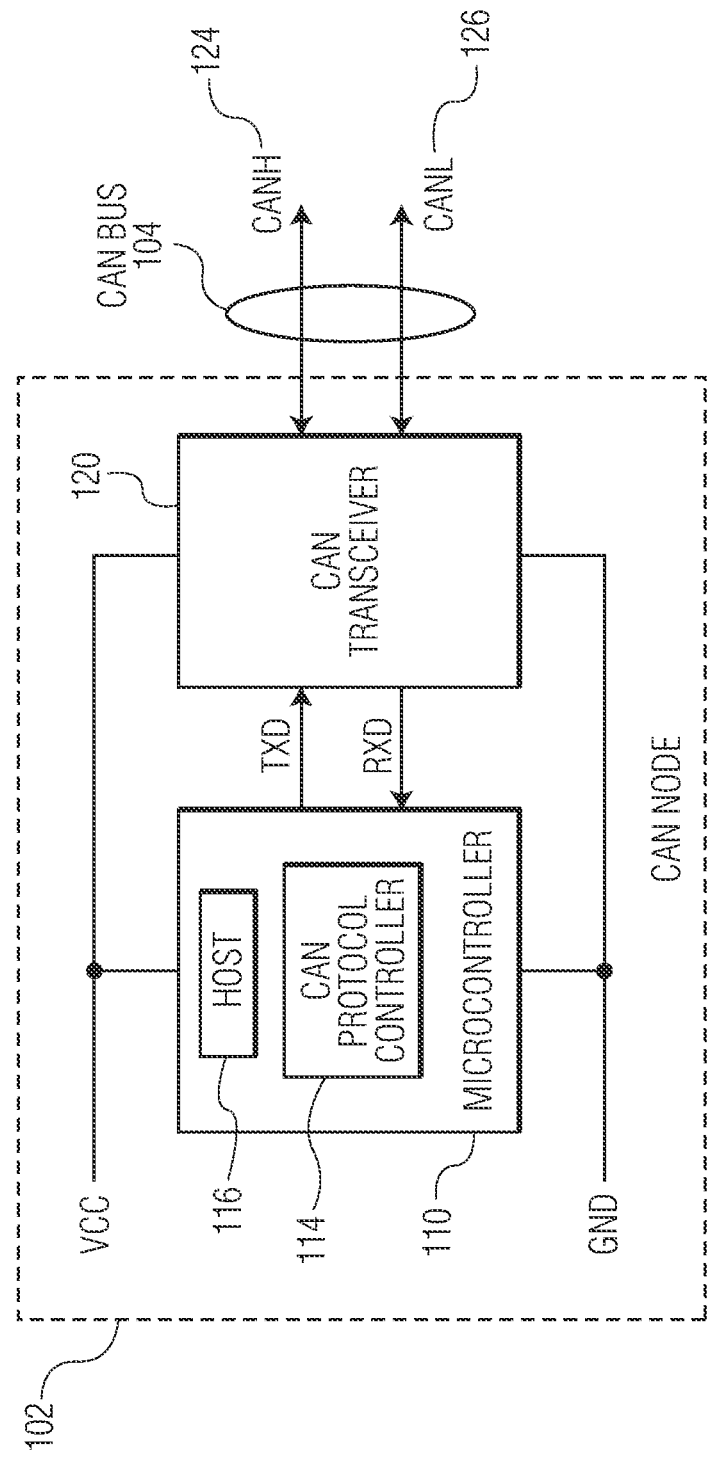
FIG. 2 depicts an expanded view of one CAN node from FIG. 1.

FIG. 2 depicts an expanded view of one CAN node 102 from FIG. 1. In the expanded view of FIG. 2, the microcontroller 110 includes a host 116, which may be, for example, a software application that is stored in memory of the microcontroller and executed by processing circuits of the microcontroller 110. The microcontroller 110 and the CAN transceiver 120 of the CAN node 102 are connected between a supply voltage, Vcc, and ground, GND. As illustrated in FIG. 2, data communicated from CAN protocol controller 114 being implemented by the microcontroller 110 to the CAN transceiver 120 is identified as transmit data (TXD) and data communicated from the CAN transceiver 120 to the CAN protocol controller 114 being implemented by the microcontroller 110 is referred to as receive data (RXD). Throughout the description, TXD is carried on a TXD path and RXD is carried on an RXD path. Data is communicated to and from the CAN bus 104 via the CANH and CANL bus lines 124 and 126, respectively.

The CAN protocol controller 114 is preferably embedded within the microcontroller 110, but may also be implemented external to the microcontroller 110 (e.g., a separate IC device). The data link layer operations between the CAN protocol controller 114 and the CAN transceiver 120 is known in the field.

For example, in receive operations, the CAN protocol controller 114 receives from the transceiver 120 serial bits in a bit stream, referred to as a RXD stream, via the RXD path. The CAN protocol controller 114 stores the received bits until an entire message is available for fetching by the microcontroller 110. The CAN protocol controller 114 can also decode the CAN message according to the standardized frame format of the CAN protocol.

In transmit operations, the CAN protocol controller 114 receives a message from the microcontroller 110 and transmits the message as serial bits in a bit stream, referred to as a TXD stream, via the TXD path in the CAN frame format to the CAN transceiver 120.

The CAN transceiver 120 is located between the CAN controller 114 being implemented by the microcontrollers 110 and the CAN bus 104. The CAN transceiver 120 is configured to implement physical layer operations as known in the field.

For example, in receive operations, a CAN transceiver 120 converts analog differential signals from the CAN bus 104 to the RXD stream of serial bits that the CAN protocol controller 114 can interpret. The CAN transceiver 120 may also protect the CAN protocol controller 114 from extreme electrical conditions on the CAN bus 104, e.g., electrical surges.

In transmit operations, the CAN transceiver 120 converts serial bits of the TXD stream received via the TXD path from the CAN protocol controller 114 into analog differential signals that are sent on the CAN bus 104.

As noted above, the CAN protocol controller 114 can be configured to support the normal mode or the flexible data rate mode. As used herein, "CAN normal mode" (also referred to as "CLASSICAL CAN mode") as well as "CAN FD mode" refer to frames that are formatted according to the ISO 11898-1 standard.

Figure 3A:
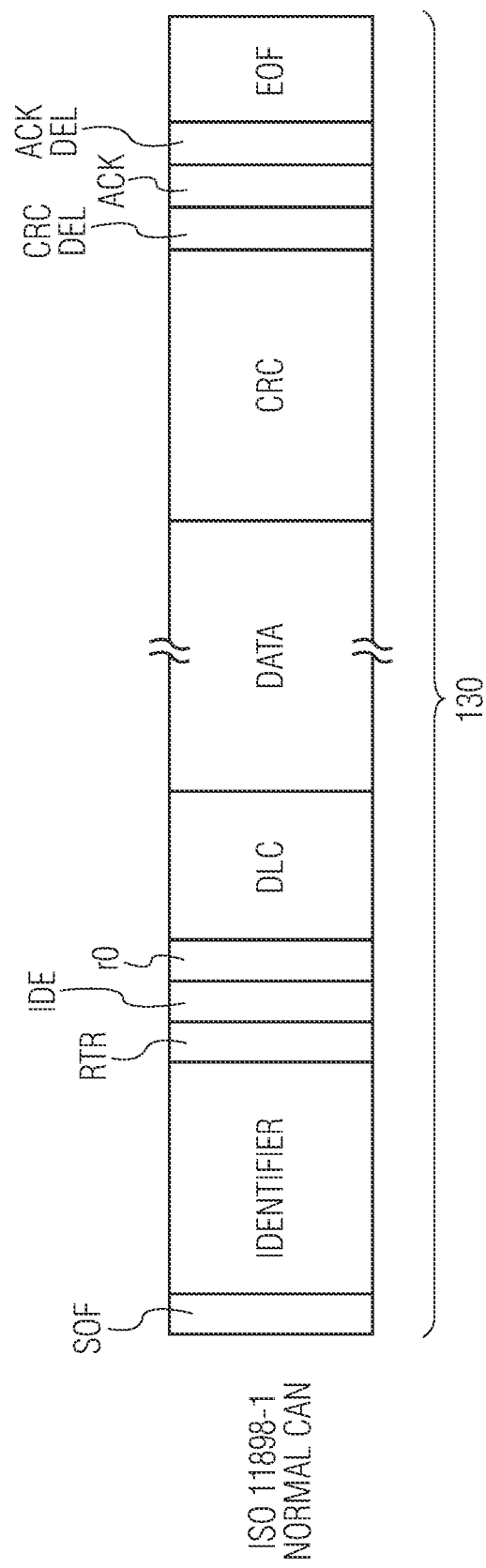
FIG. 3A depicts the format of an ISO 11898-1 standard frame that is used in CLASSIC CAN mode.
Figure 3B:
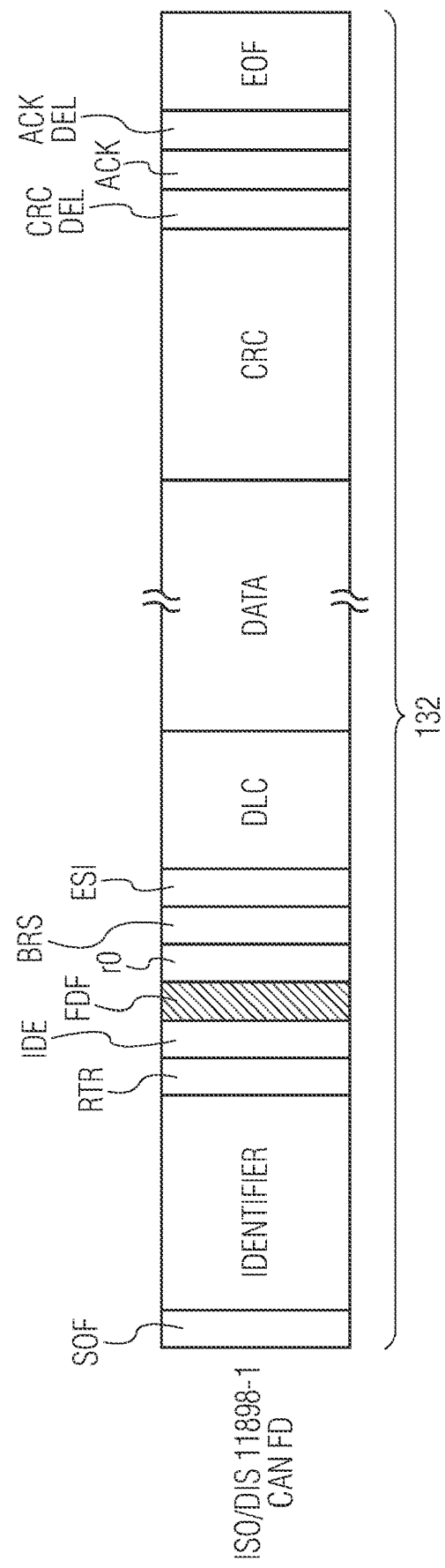
FIG. 3B depicts the format of an ISO 11898-1 standard frame that is used in CAN FD mode.

FIG. 3A depicts the format of an ISO 11898-1 frame 130 (in the classical base frame format (CBFF) or standard format) that is used in CAN normal mode and FIG. 3B depicts the format of an ISO 11898-1 frame 132 (in the FD base frame format or FBFF) that is used in CAN FD mode. The fields of the CAN normal mode and CAN FD mode frames are defined as follows:

| | |
|---|---|
| SOF | Start of Frame (always dominant) |
| IDENTIFIER | Identifier Bits, defining the message content |
| RTR | Remote transmission Request |
| IDE | ID Extension |
| r0 | Reserved Bit 0 (replaced by FDF in the CAN FD format) |
| FDF | FD Format (this is the bit distinguishing the frame formats) |
| BRS | Baud Rate Switch |
| ESI | Error State Indicator |
| DLC | Data Length Code |
| Data | Data Bytes |
| CRC | Cyclic Redundancy Check |
| CRC Del | CRC Delimiter (always recessive) |
| ACK | Acknowledge |
| ACK Del | Acknowledge Delimiter |
| EOF | End Of Frame |

There is also another version of the classical frame format, referred to as "classical extended frame format (CEFF)," in which the FDF bit is in the old r1 position, whereas the FDF bit is in the r0 position in CBFF. There is also a "FD extended frame format (FEFF)," where "extended" refers to a 29-bit identifier. Of note, the CAN protocols use the reserved bit (r0 or r1) (also referred to generally as the FDF bit) within a CAN frame to identify a frame as a CAN FD mode frame. In particular, the FDF bit is a 1-bit field that indicates whether the frame is a CAN normal mode frame (ISO 11898-1) or a CAN FD mode frame (ISO 11898-1). When the FDF bit is dominant (e.g., low or "0"), the frame is a CAN normal mode frame and when the FDF bit is recessive (e.g., high or "1"), the frame is a CAN FD mode frame. In a CAN normal mode frame, the reserved bits (r0, r1) are always driven dominant to the bus lines.

Figure 4A:
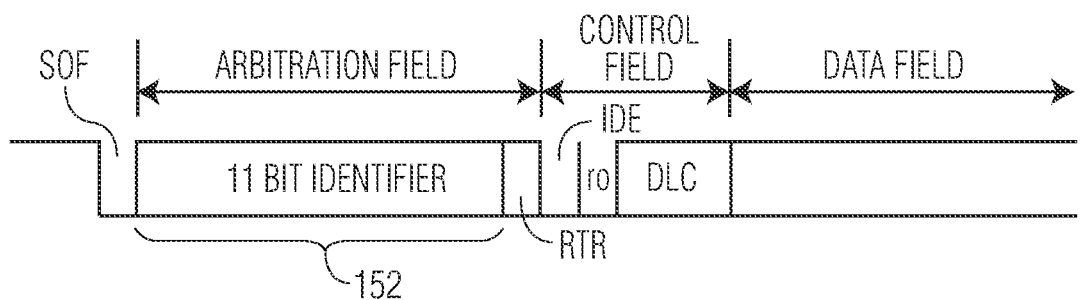
FIG. 4A depicts the IDENTIFIER field of a standard CAN frame.
Figure 4B:
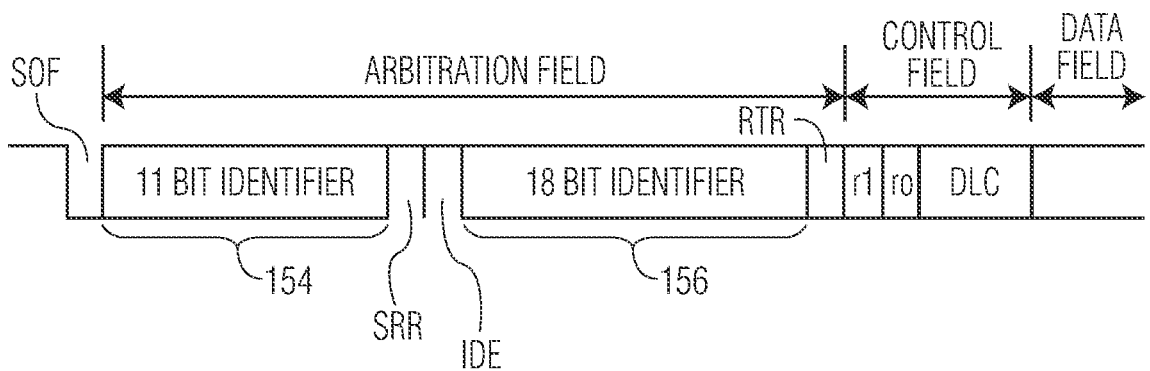
FIG. 4B depicts the IDENTIFIER field of an extended CAN frame.

CAN messages are broadcast messages and the identifier is typically unique to the sender CAN node on the same CAN bus. The CAN protocol controllers 114 of the receiving CAN nodes 102 have identifier filters that are "tuned" to certain identifiers to make sure that the host receives only relevant messages and is not bothered with irrelevant messages. Standard CAN frames have an 11-bit IDENTIFIER field to carry an 11-bit identifier and extended CAN frames have a 29-bit IDENTIFIER field to carry a 29-bit identifier. The IDENTIFIER field 152 of a standard CAN frame is depicted in FIG. 4A and the IDENTIFIER field of an extended CAN frame is depicted in FIG. 4B. As shown in FIG. 4B, the 29-bit IDENTIFIER field is divided into two sections, an 11-bit base IDENTIFIER field 154 and an 18-bit extended IDENTIFIER field 156.

To enable synchronization between a transmitting CAN node 102 and another receiving CAN node 102, long monotonous sequences of a large number of identical bits are to be prevented. The CAN protocol controller 114 is therefore configured for so-called bit stuffing. According to bit stuffing, the CAN protocol controller 114 inserts an additional inverse bit after five identical bits in the TXD stream. This means that the inverse bit is the inverse of (one of or each of) the previous five identical bits. For example, if five dominant bits are sent in series in the TXD stream, the CAN protocol controller 114 inserts a recessive bit as a stuff bit after the fifth dominant bit in the TXD stream. The same applies if, for example, five recessive bits are sent in series in the TXD stream, because in this case the CAN protocol controller 114 inserts a dominant bit as a stuff bit after the fifth recessive bit in the TXD stream. The TXD stream results in a CAN message transmitted via the CAN BUS 104 and is addressed through the identifier for a particular receiver CAN node 102. The transceiver 120 of this receiver CAN node 102 will convert the received message into serial bits in the form of a RXD stream.

The CAN protocol controller 114 of the receiver CAN node 102 knows about bit stuffing in the RXD stream and removes each stuff bit from the serial bits of a received RXD stream. For example, the CAN protocol controller 114 is preferably configured to identify bit sequence of five identical bits in the RXD stream and is further configured to remove a sixth stuff bit in the RXD stream following the received bit sequence of five identical bits. By removing a stuff bit, the actual bit series, which represents message data of the message to be transmitted, can be restored. The CAN protocol controller 114 in the receiver CAN node 102 is configured accordingly for this purpose. It is to be noted, that a stuff bit may also be referred to as a complementary stuff bit.

A stuff bit in the TXD stream as well as a stuff bit in the RXD stream are not used to represent relevant message data to be transmitted from a sender CAN node 102 to another receiver CAN node 102. Nevertheless, a CAN protocol controller 114 in the receiver CAN node 102 may be configured to assess received bits of a RXD stream, and thus also to assess a stuff bit in the RXD stream. If a stuff bit in the RXD stream violates the rules of bit stuffing, a stuff error may be detected by the CAN protocol controller 114 of the receiver CAN node 102 based on the violation.

Disturbances on the CAN bus 104 that occur solely during the transmission of a stuff bit can lead to a violation of the bit stuffing rules. The violation of the bit stuffing rules leads to the previously mentioned detection of the stuff error.

However, if the disturbance occurs solely during the transmission of the stuff bit, there is in fact no transmission error of relevant message data, but solely a transmission error of the stuff bit. A transmission error of the stuff bit may not negatively affect the transmission of the relevant message data. Against this background, there is a need to prevent stuff bit transmission errors.

The present disclosure is based on the finding that an erroneous stuff bit received at the CAN transceiver of a receiver CAN node 102 via a CAN bus 104 can still be corrected within the receiver CAN node 102 before the stuff bit is forwarded to the CAN protocol controller 114 of the receiver CAN node 102. Instead, the erroneous stuff bit may be corrected after being received at the CAN transceiver 102 such that corrected stuff bit reaches the CAN protocol controller 114 of the receiver CAN node 102. As a result, a stuff error is prevented. It is to be noted, that the findings apply in an analogous manner for a CAN transceiver of a CAN node 102, which acts as a transmitter node via the CAN bus 104. Thus, even if the following explanations may relate as an example to a CAN transceiver of a receiver CAN node 102, the following explanations apply analogously to a CAN transceiver of a transmitter CAN node 102.

Figure 5:
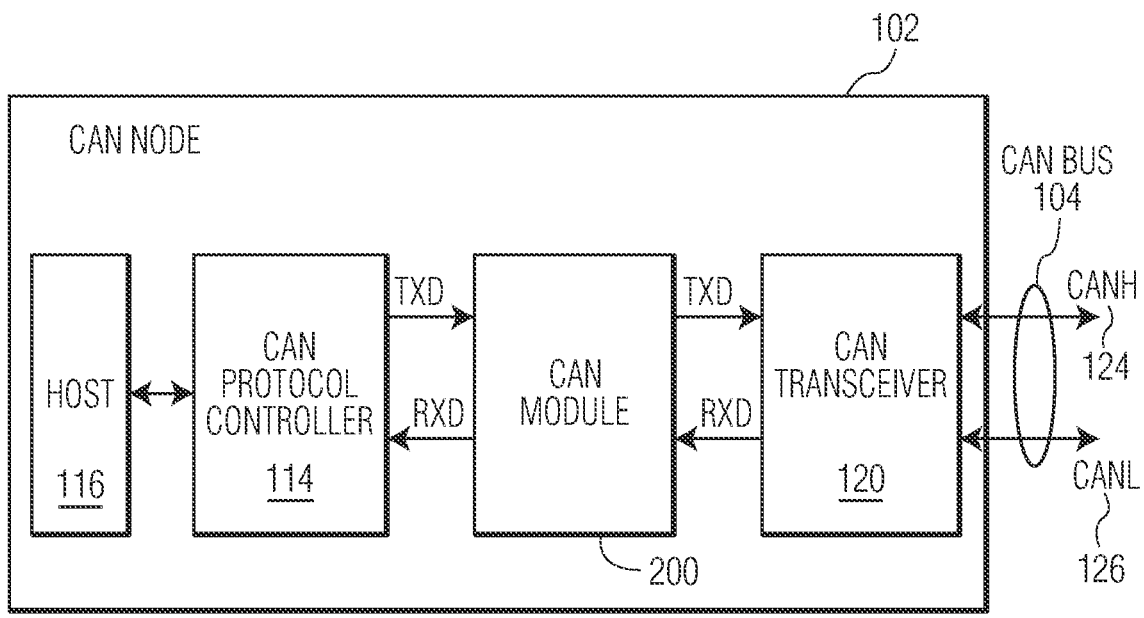
FIG. 5 shows a simplified block diagram of another CAN node.

Based on the underlying concept described above, a CAN module 200 is proposed that can be integrated, for example as illustrated in FIG. 5, into the RXD path extending from the CAN transceiver 120 to the CAN protocol controller 114. In this regard, the CAN module 200 may be separate from the CAN transceiver 120 and may also be separate from the CAN protocol controller 114. In this embodiment, the RXD path may extend from the CAN transceiver 120 to the CAN module 200. A further RXD path is provided extending form the CAN module 200 to the CAN protocol controller 114 in place of the RXD path.

Instead of a separate embodiment of the CAN module 200, it is also possible for the CAN module 200 to be at least partially integrated with the CAN transceiver 120, at least partially integrated with the CAN protocol controller 114, or at least partially integrated with both. In the following discussion, it is assumed for simplicity that the CAN module 200 is separate from the CAN transceiver 120 and the CAN protocol controller 114. However, the following explanations of the CAN module 200 apply in an analogous manner to arrangements in which the CAN module 200 is configured at least partially integrated with the CAN transceiver 21, at least partially integrated with the CAN protocol controller 114, or at least partially integrated with both.

FIG. 5 depicts an embodiment of a CAN node 102 that is configured to implement the CAN module 200. The CAN node 102 comprises the CAN module 200 as well as the CAN transceiver 120, the CAN protocol controller 114, and the host 116 as described above with reference to FIGS. 1 to 4. As shown in FIG. 5, the CAN module 200 is located in signal direction of the RXD path before the CAN protocol controller 114 such that a message communicated on the RXD path can be manipulated at the CAN module 200, before a manipulated message, which is based on the message of the RXD path, is communicated on the RXD path to be received at the CAN protocol controller 114.

Figure 6:
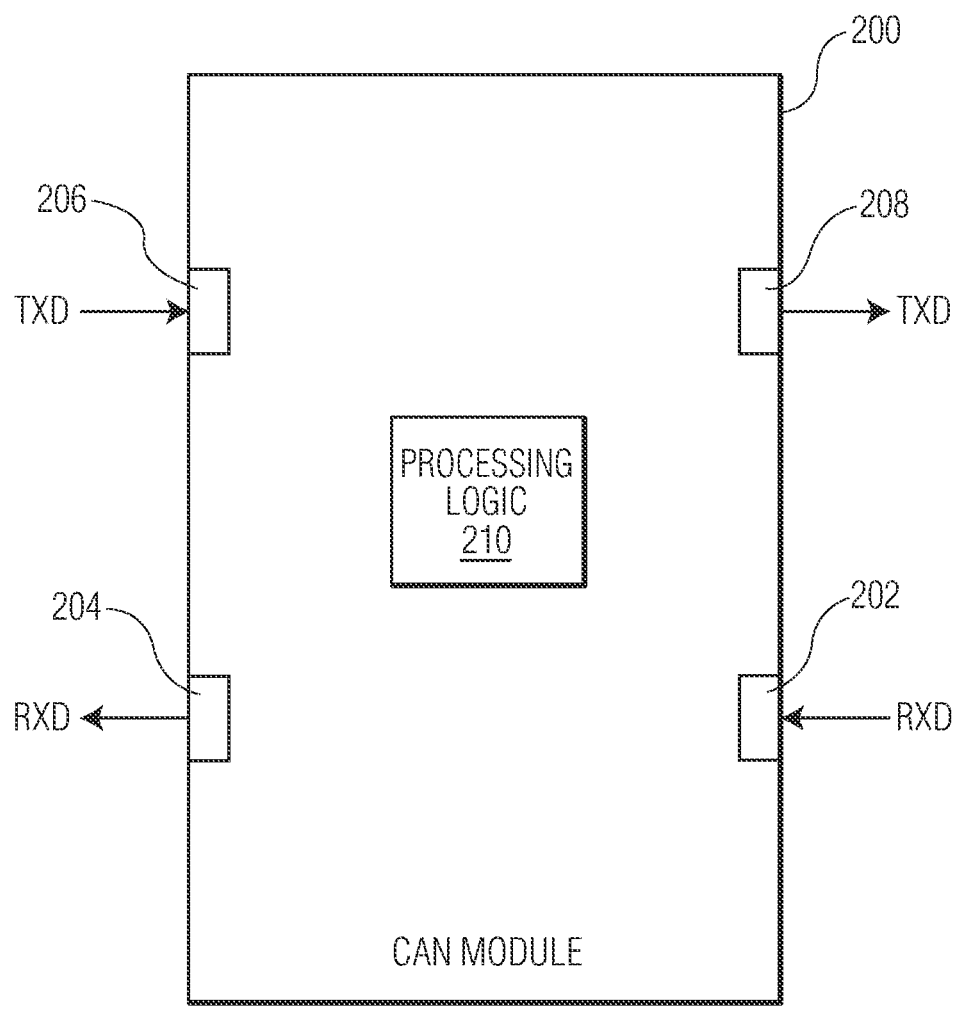
FIG. 6 shows a simplified block diagram of an example of a CAN module.
Figure 7:
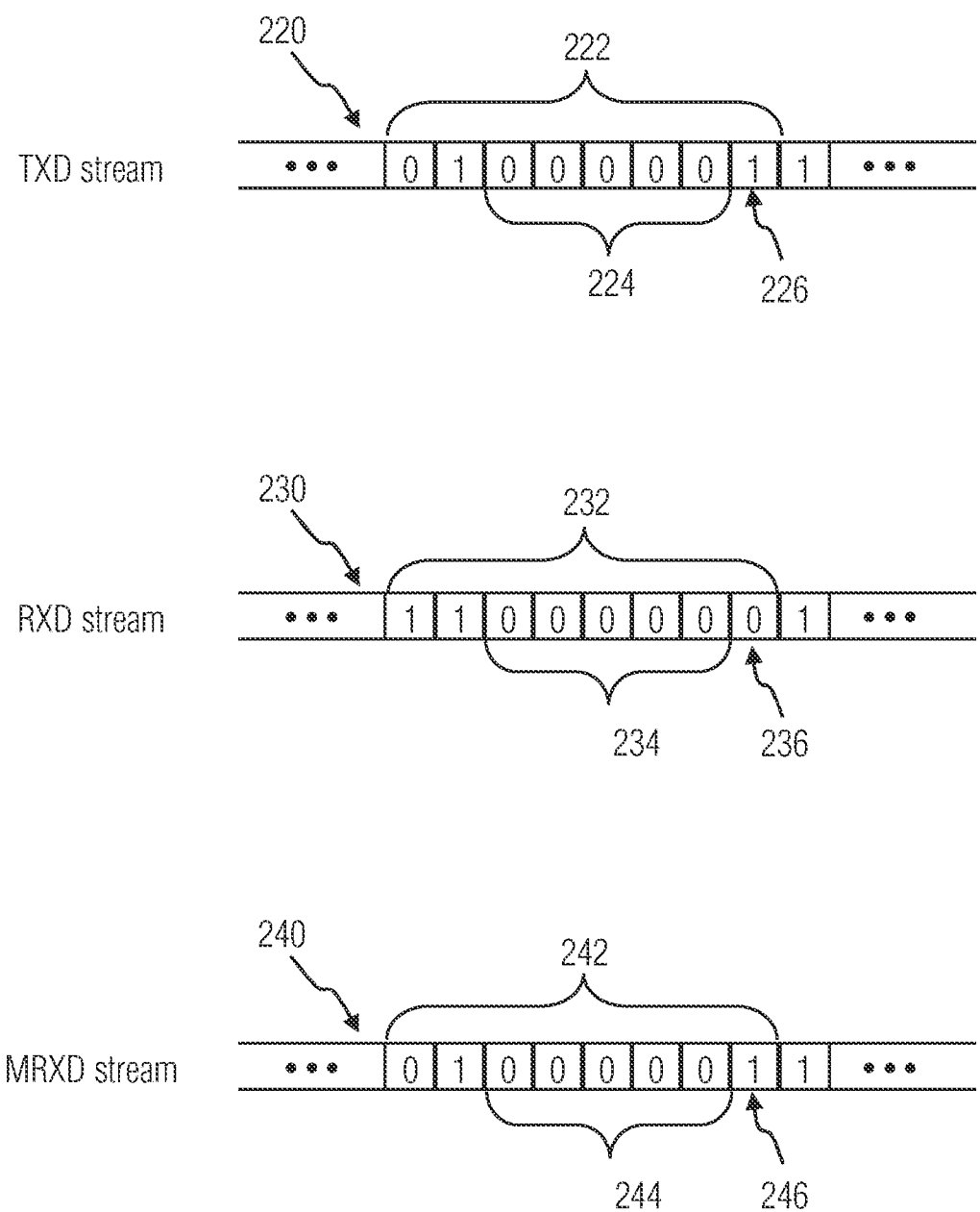
FIG. 7 schematically illustrates an example of different bit streams.

An embodiment of the CAN module 200 is schematically illustrated in FIG. 6. The CAN module 200 may be formed by software module, a hardware module or a combination thereof. Further, the CAN module may be formed by a separate apparatus or may be formed as a part of a CAN node. The CAN module 200 comprises a RXD input interface 202 configured to receive a RXD stream 230 from the CAN transceiver 120, and a RXD output interface 204 configured to send a manipulated receive data, MRXD, stream 240 to a CAN controller 114. A partial section of an example of a RXD stream 230 and a partial section of an example of a MRXD stream 240 are shown in FIG. 7. The CAN module 200 comprises a processing logic 210 configured to identify a first bit sequence 232 in the RXD stream 230, wherein the processing logic 210 is configured to identify a first position for a first stuff bit 236 in the first bit sequence 232. The processing logic 210 is also configured to manipulate the first bit sequence 232 to generate a second bit sequence 242 comprising a second stuff bit 246 at a second position in the second bit sequence 242 corresponding to the first position of the first stuff bit 236 in the first bit sequence 232 such that the second stuff bit 246 is complementary to a preceding bit of the second stuff bit 246 in the second bit sequence 242. The CAN module 200 is configured to send the second bit sequence 242 via the RXD output interface 204 to the CAN controller 114.

With reference to the aforementioned embodiment, it is noted that the RXD stream 230 is sent from the CAN transceiver 120 to the RXD input interface 202 of the CAN module 200 via the RXD path. The RXD stream 230 comprises a series of bits, and a partial section of this series of bits of the RXD stream 230 is shown schematically in FIG. 7. The illustrated bits of the RXD stream 230 comprise a first bit sequence 232 as a portion of the series of bits. Thus, the first bit sequence 232 also comprises a series of bits. In principle, it is possible for the first bit sequence 232 to form, for example, a partial section of an identifier of a CAN frame, such as the identifier 152 of the frame of FIG. 4A. In general, a bit sequence does not necessarily require that the bits of the bit sequence are distributed with equal duration. Instead, the bits of a bit sequence may vary in their time duration.

The processing logic 210 of the CAN module 200 is configured to identify the first bit sequence 232 in the RXD stream 230. The first bit sequence 232 includes the first stuff bit 236. The first stuff bit 236 may, in a particular point of time, be the last bit in the first bit sequence 232 received at RXD input interface of the CAN module 200. The processing logic 210 may identify the first bit sequence 232 in the RXD stream 230 by, for example, the first stuff bit 236 and/or the sequence 234 of five identical bits in the RXD stream 230 that directly precedes it. Another possibility for identification is explained further on in this description.

In the RXD stream 230, the associated bits are transmitted sequentially from the CAN transceiver 120 to the RXD input interface 202 of the CAN module 200. Because of this serial transmission of the bits over the RXD path, it is possible for the processing logic 210 of the CAN module 200 to identify a first position of the first stuff bit 236 in the RXD stream 230. The term "first" is used for the purpose of distinction. The first bit sequence 232 is a partial section of the RXD stream 230, and it follows that the processing logic 210 is also configured to identify the first position of the first stuff bit 236 in the first bit sequence 232. Preferably, the first position of the first stuff bit 236 in the first bit sequence 232 refers to the identical first position of the first stuff bit 236 in the RXD stream 230.

It is noted that FIG. 7 further schematically illustrates a partial section of a series of bits of an example TXD stream 220. The TXD stream 220 is sent from the CAN protocol controller 114 to the CAN transceiver 120 via the TXD path. In principle, it is possible that the CAN module 200 is integrated in the TXD path, so that the CAN module is integrated in the signal direction of the TXD path between the CAN protocol controller 114 and the CAN transceiver 120. However, it is also possible that the TXD path is branched, so that the TXD stream 220 is sent from the CAN protocol controller to both the CAN transceiver 120 and the CAN module 200. The TXD stream 220 comprises a series of bits, and a partial section of this series of bits of the TXD stream 220 is shown schematically in FIG. 7. The illustrated bits of the TXD stream 220 comprise a bit sequence 222 of a portion of the series of bits. This bit sequence 222 is referred to as the third bit sequence 222. Thus, the third bit sequence 222 also comprises a series of bits. In principle, it is possible for the third bit sequence 222 to form, for example, a partial section of an identifier of a CAN frame, such as the identifier 152 of the frame of FIG. 4A.

In the example of FIG. 7, the third bit sequence 222 of the TXD stream 220 comprises a series 224 of five consecutive identical bits. According to the bit stuffing rules, a stuff bit 226, referred to as the third stuff bit 226, is inserted into the TXD stream 220 following the series 224 by the CAN protocol controller 114. The CAN transceiver 120 receives the TXD stream 220 and sends a corresponding message over the CAN bus 104. At the same time, this message is received by the CAN transceiver 120 over the CAN bus 104 such that the CAN transceiver 120 sends an RXD stream 230 based on the received message over the RXD path. If the CAN bus 104 is subject to a disturbance, particularly if a signal representing the third stuff bit 226 is transmitted over the CAN bus 104, the RXD stream 230, which should actually be identical to the TXD stream 220 in the examples explained previously, may have the first stuff bit 236 that does not correspond to the third stuff bit 226 of the TXD stream 220. As can be seen in the example in FIG. 7, the third stuff bit 226 of the TXD stream 220 has a value of "1", whereas the first stuff bit 236 of the RXD stream 230 has a value of "0". Thus, the first stuff bit 236 is in error. The error may have been caused by a disturbance on the CAN bus 104.

If the RXD stream 230 shown in FIG. 7 with the associated first bit sequence 232 were to arrive at the CAN protocol controller 114, the CAN protocol controller 114 would interpret the first bit sequence 232 as an error frame because the first bit sequence 232 has six consecutive identical bits with the value "0". If the CAN protocol controller 114 detects a sufficient and predetermined number of times that the CAN protocol controller 114 appears to have transmitted an error frame itself, the CAN protocol controller 114 initially switches to a passive mode and, if a further number of apparently transmitted error frames are detected, switches to an off mode.

If the detection of an error frame by the CAN protocol controller 114 is based on a sequence of bits affected by a disturbance on the CAN bus 104, the detection of the error frame may be a false positive detection. The CAN module 200 may be used to prevent this false positive detection.

As previously discussed, the CAN module 200 includes an RXD input interface to receive an RXD stream 230. The processing logic 210 of the CAN module 200 is configured to identify the first bit sequence 232 and the first position of the first stuff bit 236 in the first bit sequence 232. Further, the processing logic 210 is configured to generate a second bit sequence 242. The second bit sequence 242 is based on the previously identified first bit sequence 232. However, the first bit sequence 232 may include an erroneous first stuff bit 236 in the event of disturbances on the CAN bus 104. To prevent the erroneous first stuff bit 236 from resulting in a corresponding erroneous stuff bit in the second bit sequence 242, referred to as the second stuff bit 246, the processing logic 210 is configured to generate the second bit sequence 242 by manipulating the first bit sequence 232. For the second bit sequence 242, the first bit sequence 232 is manipulated by the processing logic 210 such that the second stuff bit 246 of the second bit sequence 242 is complementary to the preceding bit of the second stuff bit 246 in the second bit sequence 242. The requirement of the second stuff bit 246 to be complementary to the preceding bit is sufficient, as this preceding bit is one of five identical bits (of the series 244) preceding the second stuff bit 246 in the second bit sequence 242.

The second position of the second stuff bit 246 in the second bit sequence 242 corresponds to the first position of the first stuff bit 236 in the first bit sequence 232. Except for the second stuff bit 246, the second bit sequence 242 may correspond to the first bit sequence 232. It follows that the second bit sequence 242 includes a series 244 of five consecutive identical bits, with the second stuff bit 246 in the second bit sequence 242 following said series 244. The CAN module 200 is configured to send the second bit sequence 242 to the CAN protocol controller 114 using the RXD output interface 204. Thus, the second bit sequence 242 is sent to the CAN protocol controller 114 in place of the first bit sequence 232. In light of this, the CAN module 200 can be integrated into the RXD path between the CAN transceiver 120 and the CAN protocol controller 114 such that the RXD stream 230 is sent from the CAN transceiver 120 to the RXD input interface 202 and the MRXD stream 240, which includes the second bit sequence 242, is sent from the RXD output interface 204 to the CAN protocol controller 114.

By manipulating the first stuff bit 236 to generate the (corrected) second stuff bit 246, the CAN module 200 can prevent a false positive detection of an error frame at the CAN protocol controller 114. Rather, the (corrected) second stuff bit 246 prevents an error frame caused by disturbances on the CAN bus 104 from being sent to the CAN protocol controller 114. The manipulation-generated second stuff bit 246 does not contribute to a corruption of the actual message data, since stuff bits in the CAN protocol controller 114 are pulled out or cleared before an interpretation of the message based on a received bit stream in the CAN protocol controller 114 occurs.

As indicated before, the terms "first", "second", "third" etc. are used for distinguishing purpose only. A second item may therefore not require a first item or third item.

It is to be noted that the first stuff bit 236, the second stuff bit 246 and the third stuff bit 226 are generally not limited to a specific type of stuff bit. In general, the first stuff bit 236 the second stuff bit 246 and the third stuff bit 226 may be either a recessive stuff bit or a dominant stuff bit.

The processing logic 210 of the CAN module 200 may be formed by a processing unit, a circuit configured for processing or a combination thereof.

In one or more embodiments of the CAN module 200, the first bit sequence 232 represents a first identifier of a first CAN frame. For example, the first bit sequence 232 may represent the identifier 152 of the CAN frame of FIG. 4A. In another example, the first bit sequence 232 may represent either the first identifier field 154 or the second identifier field 156 of the CAN frame of FIG. 4B.

A predetermined identifier of a CAN frame may be stored, preferably as a predefined series of bits, by the CAN module 200, in particular by the processing logic 210. If the first bit sequence 232 represents the predetermined identifier, the first bit sequence 232 in the RXD stream 230 is precisely and quickly identifiable by means of the processing logic 210 of the CAN module 200.

In one or more embodiments of the CAN module 200, the processing logic 210 is configured to identify a predefined number of identical, successive bits, in particular the series 234 of bits, in the first bit sequence 232. In general according to the bit stuffing rules, a series of five identical bits is followed by an additional bit stuff bit. Based on this underlying concept, in one or more embodiments of the CAN module 200, the processing logic 210 is configured to, based on the identification of the predefined number of identical, successive bits, to predict the first position for the first stuff bit 236 in the first bit sequence 232 before and/or while the first stuff bit 236 is received via the RXD input interface 202.

The processing logic 210 is preferably configured to identify the first position by the prediction of the first position. In an example, provided that the first stuff bit 236 has not yet been received via the RDX stream 230 on the RDX input interface 202 of the CAN module 200 when the first position of the first stuff bit 236 is identified, it is preferred that the processing logic 210 predicts the first position of the first stuff bit 236. This prediction may then form the identification of the first position of the first stuff bit 236. This prediction is logically possible since the series 234 of the predetermined number of identical bits has already been received via the RXD stream 230 at the RXD input interface 202 of the CAN module 200. The processing logic 210 is preferably configured to determine the position of the last bit in the already received series 234 of bits of the first bit sequence 232. Based on this position, the next position, which is the first position of the first stuff bit 236, is also computable. Preferably, the processing logic 210 is configured to perform this same calculation. In a corresponding manner, the prediction of the first position of the first stuff bit 236 may also be performed by the processing logic 210 of the CAN module 200. The predefined number may be referred to the number of five.

In one or more embodiments of the CAN module 200, the processing logic 210 is configured, based on the first bit sequence 232, to identify the first position of the first stuff bit 236 in the first bit sequence 232 after the first stuff bit 236 is received via the RXD input interface. The bits of the first bit sequence 232 are received sequentially from the RXD input interface 202 of the CAN module 200 via the RDX stream 230. By receiving the bits of the RDX stream 230 sequentially, the positions of the associated received bits are also determined by the CAN module 200. After the first bit sequence 232 is completely received by the CAN module 200 via the RDX stream 230, the position of the first stuff bit 236 can be immediately accessed. Identification of the first position of the first stuff bit 236 is particularly simple in this case, and is determined by immediately determining the first position of the first stuff bit 236 when received via the RXD stream 230 at the RXD input interface 202 of the CAN module 200.

In one or more embodiments, the CAN module 200 comprises a transmit data, TXD, input interface 206 configured to receive a TXD stream from the CAN controller 114. As indicated before, the CAN controller 114 may also be referred to as the CAN protocol controller 114. As schematically illustrated in FIG. 5, the CAN module 200 may be integrated in the TXD path extending from the CAN protocol controller 114 to the CAN transceiver 120.

In one or more embodiments, the CAN module 200 a TXD output interface 208. The CAN module 200 may be configured to forward a TXD stream received via the TXD input interface 206 to the TXD output interface 208, such that the TXD stream is sent via the TXD output interface 208 to the CAN transceiver 120.

In one or more embodiments of the CAN module 200, the processing logic 210 is configured to identify a third bit sequence 222 in the TXD stream representing bits of a third CAN frame. Further, the processing logic 210 may also be configured to identify a third position of a third stuff bit 226 in the third bit sequence. In an example, the third bit sequence 222 comprises the third stuff bitt 226. The third stuff bit may be the last bit in the third bit sequence. The third bit sequence may comprise a series 224 of five identical bits followed directly by the third stuff bit 226. For the identification of the third bit sequence 222 in the TXD stream 220 as well as for the identification of the third position of the third stuff bit 226 in the third bit sequence 222, reference is made in an analogous manner to the preceding explanations, preferred features and advantages as explained in connection with the identification of the first bit sequence 232 in the RXD stream 230 and the identification of first position of the first stuff bit 236 in the first bit sequence 232.

As previously explained, a message sent by the CAN transceiver 120 over the CAN bus 104 is simultaneously monitored by CAN transceiver 120 so that a respective RXD stream is generated by the CAN transceiver 120 from this monitored message. Consequently, the first bit sequence 232 is a result of the third bit sequence 222. Therefore, the processing logic 210 may be configured detect, whether a third bit sequence 222 is received at the TXD input interface 206, wherein the processing logic 210 may also be configured to manipulate the first bit sequence 222 to generate the second bit sequence 242 only if third bit sequence 222 is detected. Otherwise, if the first bit sequence 232 is not a result of the third bit sequence 222, the processing logic 210 may not detect the third bit sequence 222 and, as a result, may also not manipulate the first bit sequence 232, but forwards the first bit sequence 222 unchanged via the TXD output interface 208.

In one or more embodiments of the CAN module 200, the processing logic 210 of the CAN module 200 is preferably configured to identify the first position of the first stuff bit 236 in the first bit sequence 232 based on the third position of the third stuff bit 226 in the third bit sequence 222. It is expected that the receiving of the first bit sequence 232 via the RXD input interface 202 is time delayed relative to the receiving of the third bit sequence 222 via the TXD input interface 206. Given this time delay, the identification of the third position of the third stuff bit 226 may be performed by the processing logic 210 before the first stuff bit 236 is received with the first bit sequence 232. Further, the first position of the first stuff bit 236 may be identified based on the identified third position of the third stuff bit 226 by the processing logic 210 before the first stuff bit 236 is received with the first bit sequence 232. In other words, the first position of the first stuff bit 236 may have already been identified by the processing logic 210 before the first stuff bit 236 has been received by the CAN module 200. Once the third stuff bit 226 has been received, a manipulation of the first bit sequence 232 may be performed to generate the second bit sequence 242. In this case, the manipulation of the first bit sequence 232 is not delayed, in contrary may even be ahead, in time by the identification of the first position of the first stuff bit 236. As a result, the second bit sequence 242 can be generated by the processing logic 210 without a time delay.

In one or more embodiments of the CAN module 200, the processing logic 210 may be configured to manipulate the first bit sequence 232 to generate the second bit sequence 242 comprising the second stuff bit 246 at the second position corresponding to the third position of the third stuff bit 226 in the third bit sequence such that the second stuff bit 246 matches the third stuff bit 226.

In one or more embodiments of the CAN module 200, the processing logic 210 is configured to determine whether the third stuff bit 226 is either a dominant third stuff bit or a recessive third stuff bit. This may support the match of the second stuff bit 246 with the third stuff bit 226.

In one or more embodiments of the CAN module 200, the processing logic 210 is configured to manipulate the first stuff bit 236 for generating the second stuff bit 246 to be complementary to its preceding bit only if the third stuff bit 226 is determined to be a recessive third stuff bit 226.

It is again noted that the first bit sequence 232 is caused by the third bit sequence 222. A message sent by the CAN transceiver 120 based on the TXD stream 220 via the CAN bus 104 is received again by the CAN transceiver 120 with a small time delay, whereby the CAN transceiver 120 generates the RXD stream 230 based on the message received via the CAN bus 104. Thus, the third position of the third stuff bit 226 in the third bit sequence 222 corresponds to the first position of the first stuff bit 236 in the first bit sequence 232. Furthermore, the third position of the third stuff bit 226 in the third bit sequence 222 corresponds to the second position of the second stuff bit 246 in the second bit sequence 242. The first TXD stream 220 transmits the third bit sequence 222 to the CAN transceiver 120. If the third stuff bit 226 of the third bit sequence 222 is a dominant stuff bit, it can be assumed with a higher probability that the dominant stuff bit is robust to disturbances on the CAN bus 104. This is because the dominant stuff bit is represented on the CAN bus 104 by a non-zero differential voltage, preferably a differential voltage of 2 V, between the CAN bus lines 124, 126. With this in mind, it can be assumed with a higher probability that the dominant third stuff bit 226 leads to a dominant first stuff bit 236 in the first bit sequence 232. In this case, since the dominant first stuff bit 236 corresponds to the dominant third stuff bit 226, manipulation of the first stuff bit 236 for generating the second stuff bit 246 is not necessary. Instead, provided that the third stuff bit 226 is a dominant stuff bit, manipulation of the first bit sequence 232 to generate the second bit sequence 242 may be suspended. In other words, it may be provided that the second bit sequence 242 is formed from the first bit sequence 232 without manipulation if the third stuff bit 226 is a dominant stuff bit. However, the previously explained manipulation may be performed by the processing logic 210 to generate the second bit sequence 242 if the third stuff bit 226 is a recessive stuff bit. Since processing logic 210 only needs to perform the previously explained manipulation in the case of a recessive third stuff bit 226, the computational effort and costs of processing logic 210 may be reduced.

In one or more embodiments of the CAN module 200, the processing logic 210 is configured to identify multiple first stuff bits in the first bit sequence, wherein the processing logic 210 is configured to manipulate the first bit sequence 232 to generate the second bit sequence 242 comprising for each first stuff bit 236 an associated second stuff bit 246 at a position corresponding to the position of the respective associated first stuff bit 236 in the first bit sequence 232. Therefore, the preceding explanations for generating a second stuff bit 246 by manipulating the first stuff bit 236 apply in an analogous manner to each second stuff bit 246 of the second bit sequence 242.

Figure 8:
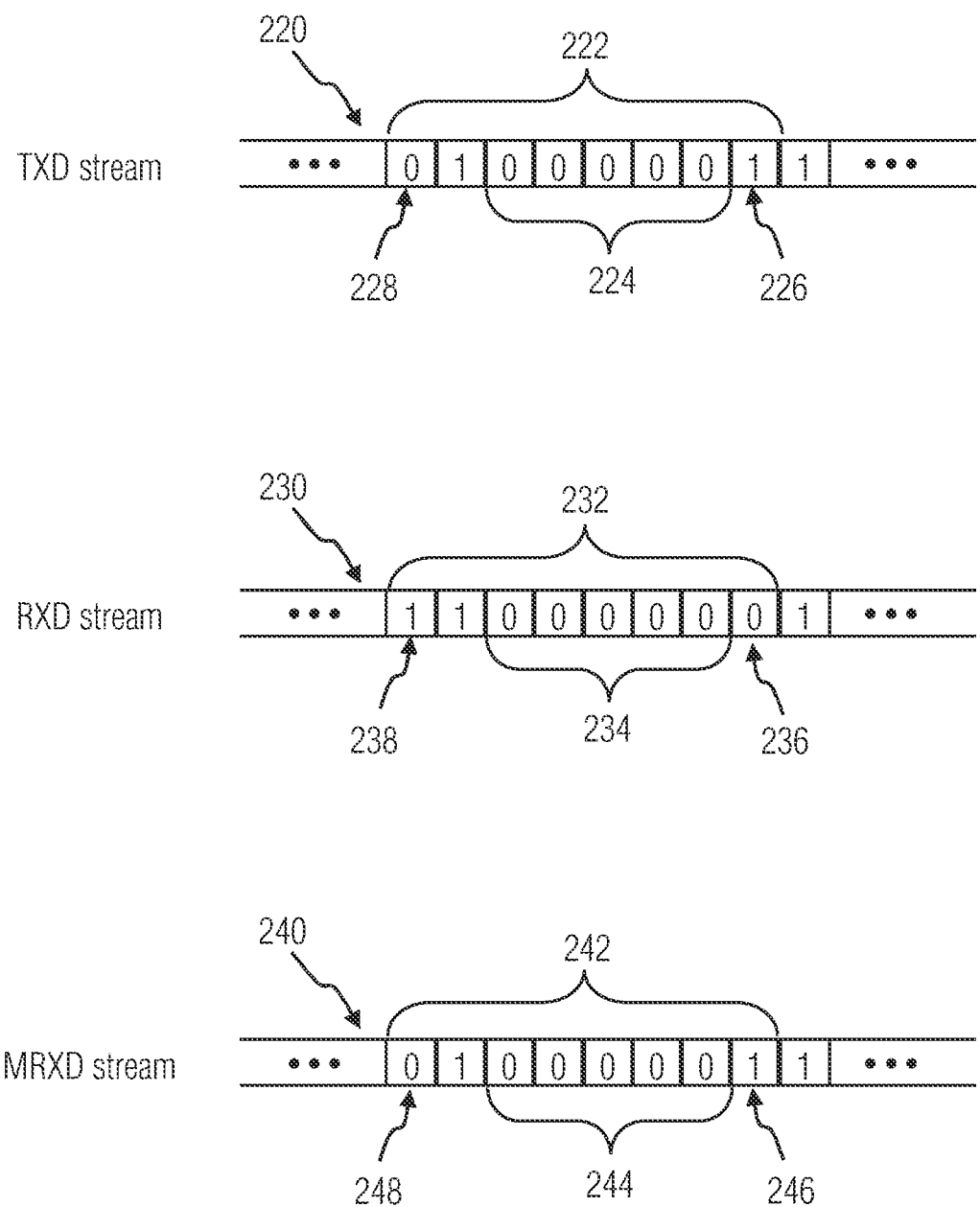
FIG. 8 schematically illustrates another example of different bit streams.
Figure 9:
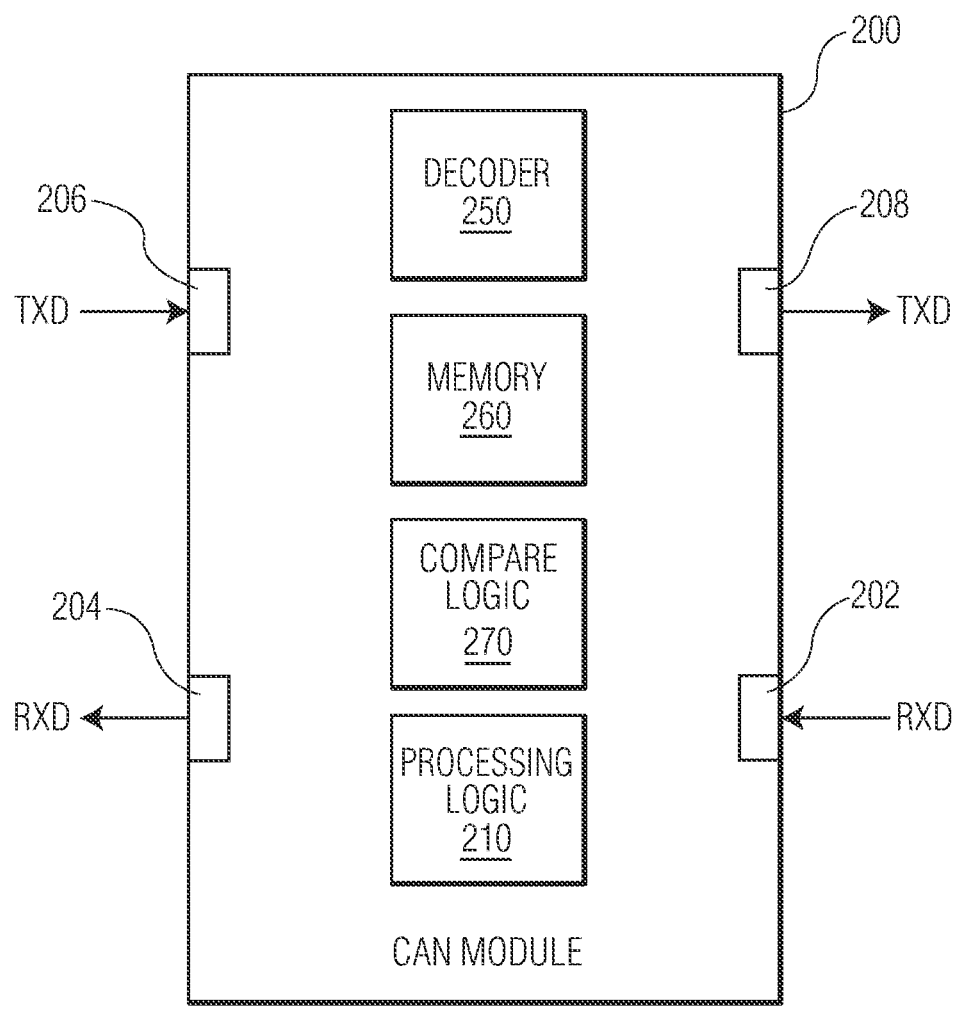
FIG. 9 shows a simplified block diagram of another example of a CAN module.

FIG. 8 schematically illustrates another example of the partial sections of the TXD stream 220, the RXD stream 230 and the MRXD stream 240. The previous explanations in connection with FIG. 7 are referred to in an analogous manner. As can be seen from the TXD stream 220 of FIG. 8, the third bit sequence 222 has a bit 228 which is assumed not to be a stuff bit. This bit 228 is also referred to as the fourth non-stuff bit 228, which is assumed to be dominant. If a message based on the third bit sequence 222 is transmitted by the CAN transceiver 120 on the CAN bus 104, it is possible, albeit in rare cases, that a signal on the CAN bus 104 representing the fourth non-stuff bit 228 may be affected by disturbance. This disturbance may cause the message monitored by the CAN transceiver 120 to represent the first bit sequence 232, where a sixth bit 238 of the first bit sequence 232 is a recessive bit even though it should be a dominant bit corresponding to the fourth non-stuff bit 228. Considering the above, there is a demand to prevent the previously explained error by means of the CAN module 200.

In one or more embodiments of the CAN module 200, wherein the processing logic 210 is configured to identify a fourth, dominant, non-stuff bit 228 in the third bit sequence, wherein the processing logic 210 is configured to manipulate the first bit sequence 232 to generate the second bit sequence 242 also comprising a fifth non-stuff bit 248 at a position in the second sequence 242 corresponding to the position of the fourth non-stuff bit 228 in the third bit sequence 222 such that the fifth non-stuff bit 248 matches the fourth non-stuff bit 228.

Based on the identification of the fourth non-stuff bit 228 as a dominant bit, manipulation at the corresponding bit position of the first bit sequence 232 to generate the second bit sequence 242 (i.e., at the sixth non-stuff bit 238) may be performed by the processing logic 210 such that the fifth non-stuff bit 248 of the second bit sequence 242 corresponds to the (dominant) fourth non-stuff bit 228 of the third bit sequence 222. An error on the sixth non-stuff bit 238 of the first bit sequence 232 caused by a disturbance on the CAN bus 104 can thus be corrected.

It is noted that the last explained manipulation of the first bit sequence 232 to generate the second bit sequence 242 may be understood as an extension of the previously explained manipulation of the first bit sequence 232 to generate the second bit sequence 242. Thus, with the manipulation of the first bit sequence 232 that can be performed by the processing logic 210 to generate the second bit sequence 242, it can be achieved, on the one hand, that the second stuff bit 246 is complementary to the preceding bit in the second bit sequence 242 and, on the other hand, that the fifth non-stuff bit 248 of the second bit sequence 242 matches the fourth non-stuff bit 228 of the third bit sequence 222.

In one or more embodiments of the CAN module 200, the processing logic 210 may also be configured to identify multiple fourth, dominant, non-stuff bits 228 in the third bit sequence 222, wherein the processing logic 210 may be configured to manipulate the first bit sequence 232 to generate the second bit sequence 242 also comprising, for each fourth non-stuff bit 228, an associated fifth non-stuff bit 248 at a position in the second bit sequence 242 corresponding to the position of the associated fourth non-stuff bit 228 in the third bit sequence 222 such that each fifth non-stuff bit 248 matches the associated fourth non-stuff bit 228.

In one or more embodiments, the CAN module 200 comprises the transmit data, TXD, input interface 206 configured to receive the TXD stream from the CAN controller 114. The CAN module 200 may also comprise a decoder 250 configured to decode an identifier 152, 154, 156 of a CAN frame being received via the TXD input interface 206. The identifier 152, 154, 156 may be referred to as the decoded identifier 152, 154, 156. The CAN module 200 may also comprise a memory 260 configured to store at least one valid identifier. Further, the CAN module 200 may comprise a compare logic 270 configured to compare the decoded identifier 152, 154, 156 with the at least on valid identifier and output a mismatch signal, if the comparison indicates that the decoded identifier 152, 154, 156 does not match any of the at least one valid identifier.

Security is a growing concern with in-vehicle networks. Many of the components of an in-vehicle network utilize software that may be updated. In order to update software, in-vehicle networks often have "back door" access ports. If a back door access port is hacked, elements in the in-vehicle network may be compromised. One known attack technique on an in-vehicle network that uses the CAN protocol involves an attacker sending CAN massages from a compromised node using CAN Identifiers that are normally not assigned to this node. Such unauthorized CAN messages may be received by CAN nodes on the CAN bus and recognized as valid messages because the identifier has previously been used within the CAN network. Once received by a CAN node on the CAN bus, the suspicious messages can be used to implement malicious activity within the CAN node. For example, if a node may be allowed to send ID=101 1100 0011, but not 101 1100 0000, then sending an error frame for valid reasons at the end of the ID may cause a false alarm. Thus, there is a need to prevent any valid reason for sending error frames during the arbitration phase.

To detect and prevent such an attack on the CAN network and in accordance with an embodiment of CAN module 200, the decoder 250 can be configured to decode the identifier of a CAN frame that is being sent by the CAN protocol controller 114 to the CAN module 200. The compare logic 270 of the CAN module 200 may further be configured to compare the decoded identifier of incoming CAN frame to the at least one stored and valid identifier to generate a mismatch signal if any incoming CAN frame does not match any of the at least on valid identifier. Since identifiers are pre-assigned to each CAN node, if the decoded identifier does not match any of the stored and valid identifier, it can be assumed that the CAN frame is received at the CAN module 200 on its TXD input pin form an intruded or hacked CAN protocol controller 114. To protect the CAN network and the CAN nodes connected to it from potential damage, actions can be triggered based on the mismatch signal. For example, in response to mismatch signal, the CAN module 200 may be configured to immediately send an error signal such as an error flag to the transceiver via the TXD output interface 208, which sends this error signal onto the CAN bus to prevent a malicious CAN frame form the inferred and/or hacked CAN protocol controller 144 from being successfully and completely received by any CAN nodes on the CAN bus, e.g., to invalidate, destroy, and/or kill the CAN frame.

In one or more embodiments, the decoder 250 may be configured to decode a CAN frame before the complete CAN frame is received via the TXD stream at the TXD input interface 206.

In one or more embodiments, the compare logic 270 may be configured to compare the decoded identifier with the at least one valid identifier before the complete CAN frame is received via the TXD stream at the TXD input interface 206.

In one or more embodiments, the CAN module 200 comprises the TXD output interface 208 configured to forward the TXD stream to the CAN transceiver 120, wherein the CAN module 200 is configured to interrupt the forwarding of the received TXD stream in response to the mismatch signal. For instance, if the comparison indicates that the decoded identifier from the CAN frame does not match any of the valid and stored identifiers, the mismatch signal is generated by the compare logic 270 resulting in the interruption of the forwarding of the received TXD stream. The match signal may also trigger the CAN module 200 to invalidate, destroy, and/or kill the received CAN frame provided with the received CAN stream before the complete CAN frame is provided to the TXD output interface 208.

In one or more embodiments, the CAN module 200 comprises a signal generator configured to generate an invalidation signal in response to the mismatch signal, wherein the CAN module 200 may also comprise a signal output interface configured to send the invalidation signal to the CAN transceiver 120 to invalidate the CAN frame 152, 154, 156 of the TXD stream. The invalidation signal may represent an error frame. Thus, the signal output interface may be configured to cause the invalidation signal on the CAN bus to invalidate the CAN frame 152, 154, 156 on the CAN bus.

Figure 10:
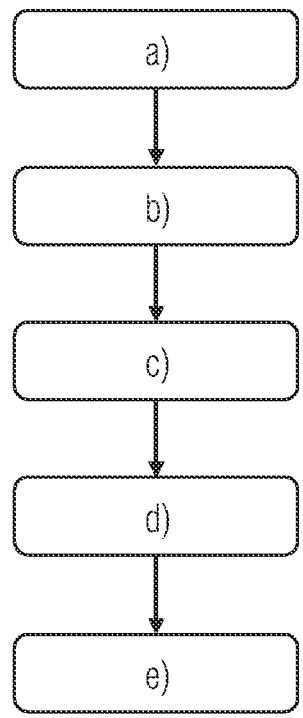
FIGS. 10 to 12 shows simplified flow charts of different examples of the method for the CAN module.

According to another example of the present disclosure, a method for the CAN module 200 is schematically illustrated in FIG. 10, the method comprising the steps a) to e):

a) receiving a receive data, RXD stream 230 from a CAN transceiver 114 at a RXD input interface 202 of the CAN module 200, b) identifying a first bit sequence 232 in the RXD stream 230 at a processing logic 210 of the CAN module 200, c) identifying a first position for a first stuff bit 236 in the first bit sequence 232 at the processing logic 210, d) manipulating the first bit sequence 232 at the processing logic 210 to generate a second bit sequence 242 comprising a second stuff bit 246 at a second position in the second bit sequence 242 corresponding to the first position of the first stuff bit 236 in the first bit sequence 232 such that the second stuff bit 246 is complementary to a preceding bit of the second bit stuff bit 246 in the second bit sequence 242, and e) sending the second bit sequence 242 via a RXD output interface 204 of the CAN module 200 to a CAN controller 114.

The steps a) to e) may be performed in the shown order, but may also be performed at least partly in parallel or in another order. The same applies to the following embodiments of the method as well, also in terms of the further steps of the respective embodiment.

Figure 11:
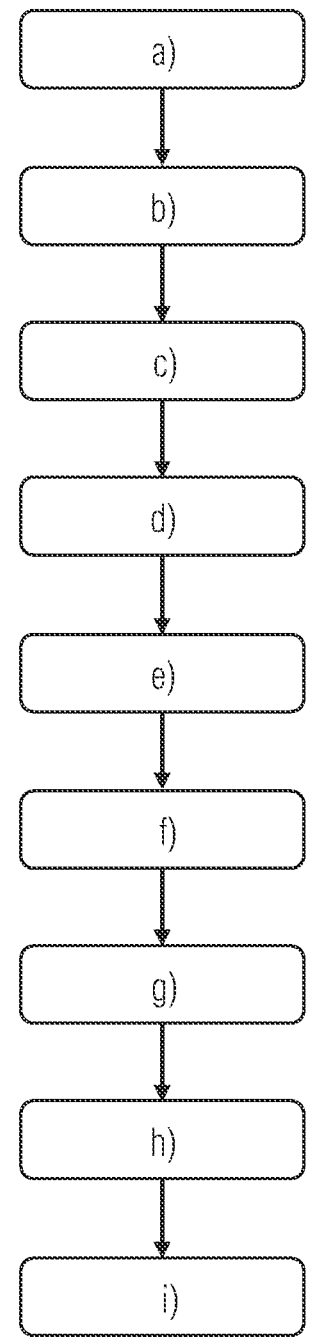

In one or more embodiments, the method as schematically illustrated in FIG. 11 comprises the further steps f) to i):

f) receiving a TXD stream 220 from a CAN controller 114 at a transmit data, TXD, input interface 206 of the CAN module 200, g) identifying a third bit sequence 222 in the TXD stream 220 representing bits of a third CAN frame 152, 154, 156 at the processing logic 210, h) identifying a third position of a third stuff bit 226 in the third bit sequence 220 at the processing logic 220, wherein the first bit sequence 232 is a result of the third bit sequence 222, and i) identifying, at the processing logic 210, the first position of the first stuff bit 236 in the first bit sequence 232 based on the third position of the third stuff bit 226 in the third bit sequence 222.

Figure 12:
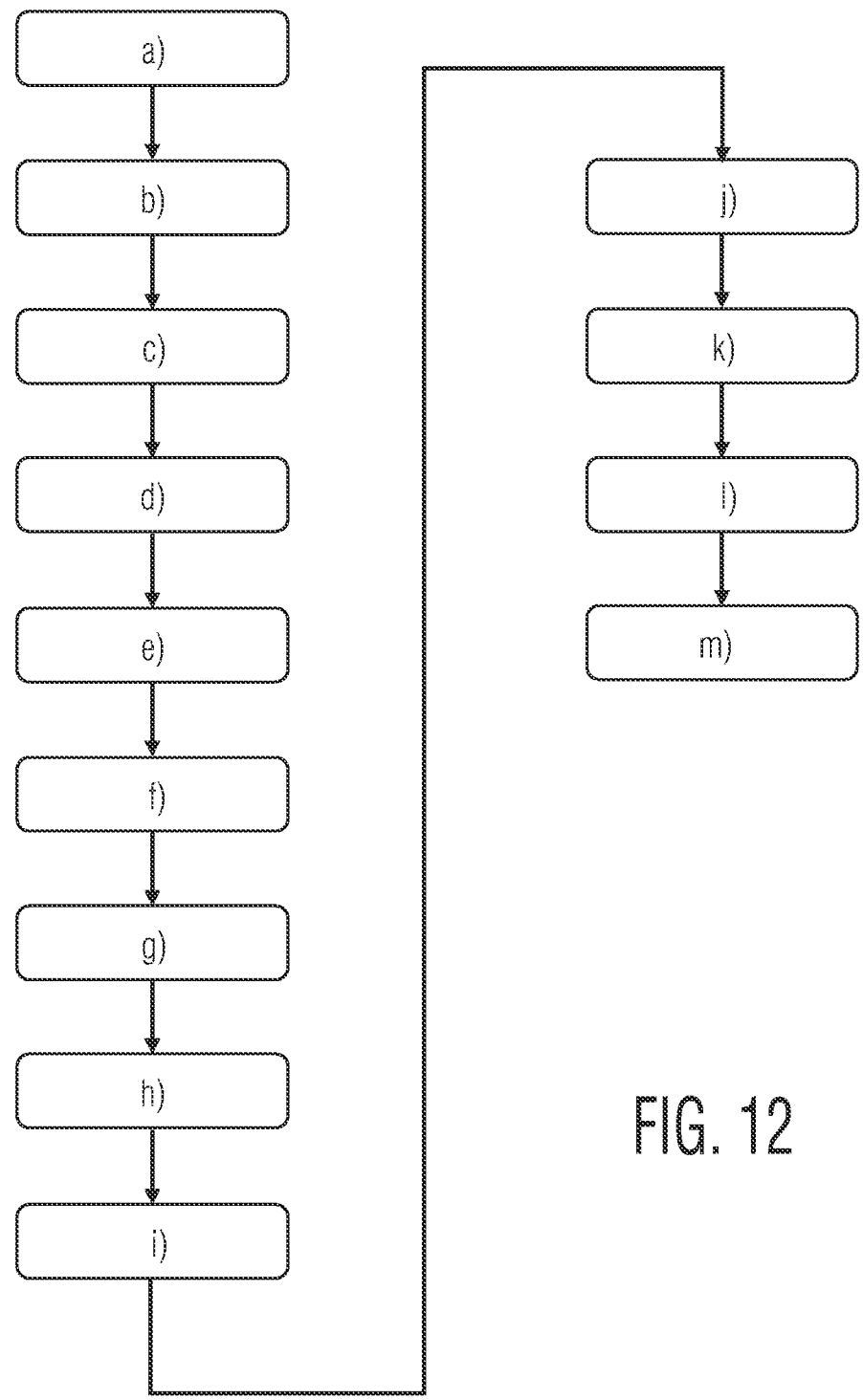

In one or more embodiments, the method as schematically illustrated in FIG. 12 comprises the further steps j) to m):

j) forwarding the TXD stream 220 to the CAN transceiver 120 via a TXD output interface 208 of the CAN module 200, k) decoding an identifier of the CAN frame 152, 154, 156 being received via the TXD input interface at a decoder 250 of the CAN module 200, wherein the CAN module 200 comprising a memory 260 configured to store at least one valid identifier, l) comparing, at a compare module 270 of the CAN module 200, the identifier 152, 154, 156 being decoded with the at least on valid identifier and output a mismatch signal, if the comparison indicates that the decoded identifier 152, 154, 156 does not match any of the at least one valid identifier, and m) interrupting the forwarding of the TXD stream 220 in response to the mismatch signal.

The CAN module 200 and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processing logic", "processor" or "processing unit" may refer to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" may refer to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random-access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A Controller Area Network (CAN) module, comprising:

a receive data (RXD), input interface configured to receive an RXD stream from a CAN transceiver;

an RXD output interface configured to send a manipulated receive data (MRXD) stream to a CAN controller; and processing logic configured to identify a first bit sequence in the RXD stream;

wherein the processing logic is configured to identify a first position for a first stuff bit in the first bit sequence;

wherein the processing logic is configured to manipulate the first bit sequence to generate a second bit sequence comprising a second stuff bit at a second position in the second bit sequence corresponding to the first position of the first stuff bit in the first bit sequence such that the second stuff bit is complementary to a preceding bit of the second stuff bit in the second bit sequence; and wherein the CAN module is configured to send the second bit sequence via the RXD output interface to the CAN controller.

2. The CAN module of claim 1, wherein the first bit sequence represents a first identifier of a first CAN frame.

3. The CAN module of claim 1, wherein the processing logic is configured to identify a predefined number of identical, successive bits in the first bit sequence and, based on this identification, to predict the first position for the first stuff bit in the first bit sequence before and/or while the first stuff bit is received via the RXD input interface.

4. The CAN module of claim 1, wherein the processing logic is configured, based on the first bit sequence, to identify the first position of the first stuff bit in the first bit sequence after the first stuff bit is received via the RXD input interface.

5. The CAN module of claim 1, wherein the first bit sequence represents a first identifier of a first CAN frame, wherein the processing logic is configured to identify a predefined number of identical, successive bits in the first bit sequence and, based on this identification, to predict the first position for the first stuff bit in the first bit sequence before and/or while the first stuff bit is received via the RXD input interface, and wherein the processing logic is configured, based on the first bit sequence, to identify the first position of the first stuff bit in the first bit sequence after the first stuff bit is received via the RXD input interface.

6. The CAN module of claim 1,
wherein the CAN module comprises a transmit data, TXD, input interface configured to receive a TXD stream from the CAN controller;
wherein the processing logic configured to identify a third bit sequence in the TXD stream representing bits of a third CAN frame;
wherein the processing logic is configured to identify a third position of a third stuff bit in the third bit sequence;
wherein the first bit sequence is a result of the third bit sequence, and
wherein the processing logic is configured to identify the first position of the first stuff bit in the first bit sequence based on the third position of the third stuff bit in the third bit sequence.

7. The CAN module of claim 1, wherein the first bit sequence represents a first identifier of a first CAN frame, wherein the processing logic is configured to identify a predefined number of identical, successive bits in the first bit sequence and, based on this identification, to predict the first position for the first stuff bit in the first bit sequence before and/or while the first stuff bit is received via the RXD input interface, wherein the processing logic is configured, based on the first bit sequence, to identify the first position of the first stuff bit in the first bit sequence after the first stuff bit is received via the RXD input interface, wherein the CAN module comprises a transmit data, TXD, input interface configured to receive a TXD stream from the CAN controller, wherein the processing logic configured to identify a third bit sequence in the TXD stream representing bits of a third CAN frame, wherein the processing logic is configured to identify a third position of a third stuff bit in the third bit sequence, wherein the first bit sequence is a result of the third bit sequence, and wherein the processing logic is configured to identify the first position of the first stuff bit in the first bit sequence based on the third position of the third stuff bit in the third bit sequence.

8. The CAN module of claim 6, wherein the processing logic is configured to determine whether the third stuff bit is either a dominant third stuff bit or a recessive third stuff bit.

9. The CAN module of claim 8, wherein the processing logic is configured to manipulate the first stuff bit for generating the second stuff bit to be complementary to its preceding bit only if the third stuff bit is determined to be a recessive third stuff bit.

10. The CAN module of claim 1,
wherein the processing logic is configured to identify multiple first stuff bits in the first bit sequence; and
wherein the processing logic is configured to manipulate the first bit sequence to generate the second bit sequence comprising for each first stuff bit an associated second stuff bit at a position corresponding to the position of the respective associated first stuff bit in the first bit sequence.

11. The CAN module of claim 7, wherein the processing logic is configured to determine whether the third stuff bit is either a dominant third stuff bit or a recessive third stuff bit, wherein the processing logic is configured to manipulate the first stuff bit for generating the second stuff bit to be complementary to its preceding bit only if the third stuff bit is determined to be a recessive third stuff bit, wherein the processing logic is configured to identify multiple first stuff bits in the first bit sequence, and wherein the processing logic is configured to manipulate the first bit sequence to generate the second bit sequence comprising for each first stuff bit an associated second stuff bit at a position corresponding to the position of the respective associated first stuff bit in the first bit sequence.

12. The CAN module of claim 6,
wherein the processing logic is configured to identify a fourth, dominant, non-stuff bit in the third bit sequence; and
wherein the processing logic is configured to manipulate the first bit sequence to generate the second bit sequence also comprising a fifth non-stuff bit at a position in the second sequence corresponding to the position of the fourth non-stuff bit in the third bit sequence such that the fifth non-stuff bit matches the fourth non-stuff bit.

13. The CAN module of claim 1,
wherein the CAN module comprising a transmit data, TXD, input interface configured to receive a TXD stream from the CAN controller;
wherein the CAN module comprising a decoder configured to decode an identifier of a CAN frame being received via TXD stream;
wherein the CAN module comprising a memory configured to store at least one valid identifier; and
wherein the CAN module comprising a compare logic configured to compare the identifier being decoded by the decoder with the at least on valid identifier and output a mismatch signal, if the comparison indicates that the decoded identifier does not match any of the at least one valid identifier.

14. The CAN module of claim 11, wherein the processing logic is configured to identify a fourth, dominant, non-stuff bit in the third bit sequence, wherein the processing logic is configured to manipulate the first bit sequence to generate the second bit sequence also comprising a fifth non-stuff bit at a position in the second sequence corresponding to the position of the fourth non-stuff bit in the third bit sequence such that the fifth non-stuff bit matches the fourth non-stuff bit, wherein the CAN module comprising a transmit data, TXD, input interface configured to receive a TXD stream from the CAN controller, wherein the CAN module comprising a decoder configured to decode an identifier of a CAN frame being received via TXD stream, wherein the CAN module comprising a memory configured to store at least one valid identifier, and wherein the CAN module comprising a compare logic configured to compare the identifier being decoded by the decoder with the at least on valid identifier and output a mismatch signal, if the comparison indicates that the decoded identifier does not match any of the at least one valid identifier.

15. The CAN module of claim 13;
wherein the CAN module comprising a TXD output interface configured to forward the TXD stream to the CAN transceiver; and
wherein the CAN module is configured to interrupt the forwarding of the TXD stream in response to the mismatch signal.

16. The CAN module of claim 13;
wherein the CAN module comprising a signal generator configured to generate an invalidation signal in response to the mismatch signal; and
wherein the CAN module comprising a signal output interface configured to send the invalidation signal to the CAN transceiver to invalidate the CAN frame of the TXD stream.

17. A method for a Controller Area Network, CAN, module, the method comprising:
receiving a receive data, RXD stream from a CAN transceiver at a RXD input interface of the CAN module;
identifying a first bit sequence in the RXD stream at a processing logic of the CAN module;
identifying a first position for a first stuff bit in the first bit sequence at the processing logic;
manipulating the first bit sequence at the processing logic to generate a second bit sequence comprising a second stuff bit at a second position in the second bit sequence corresponding to the first position of the first stuff bit in the first bit sequence such that the second stuff bit is complementary to a preceding bit of the second bit stuff bit in the second bit sequence; and
sending the second bit sequence via a RXD output interface of the CAN module to a CAN controller.

18. The method of claim 17, further comprising the steps:
receiving a TXD stream from the CAN controller at a transmit data, TXD, input interface of the CAN module;
identifying a third bit sequence in the TXD stream representing bits of a third CAN frame at the processing logic;
identifying a third position of a third stuff bit in the third bit sequence at the processing logic, wherein the first bit sequence is a result of the third bit sequence; and
identifying, at the processing logic, the first position of the first stuff bit in the first bit sequence based on the third position of the third stuff bit in the third bit sequence.

19. The method of claim 18, further comprising the steps:
forwarding the TXD stream to the CAN transceiver via a TXD output interface of the CAN module,
decoding an identifier of a CAN frame being received via the TXD input interface at a decoder of the CAN module, wherein the CAN module comprising a memory configured to store at least one valid identifier,
comparing, at a compare module of the CAN module, the identifier being decoded with the at least on valid identifier and output a mismatch signal, if the comparison indicates that the decoded identifier does not match any of the at least one valid identifier, and
interrupting the forwarding of the TXD stream in response to the mismatch signal.

20. A non-transitory storage medium storing executable instructions which are configured, when executed by a processor of a Controller Area Network (CAN) module, to cause said processor to carry out the method of claim 17.

* * * * *